United States Patent
Friedman

(10) Patent No.: US 8,479,154 B1
(45) Date of Patent: Jul. 2, 2013

(54) INTERACTION WITH PARTIALLY CONSTRUCTED MOBILE DEVICE APPLICATIONS

(75) Inventor: Mark S. Friedman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 137 days.

(21) Appl. No.: 12/860,064

(22) Filed: Aug. 20, 2010

(51) Int. Cl.
*G06F 9/44* (2006.01)
*G06F 9/45* (2006.01)

(52) U.S. Cl.
USPC ............ 717/106; 717/100; 717/134; 717/139

(58) Field of Classification Search
None
See application file for complete search history.

(56) References Cited

U.S. PATENT DOCUMENTS

| | | | |
|---|---|---|---|
| 7,188,333 B1 * | 3/2007 | LaMotta et al. | 717/106 |
| 7,861,213 B2 | 12/2010 | Wang | |
| 7,908,580 B2 | 3/2011 | Stubbs et al. | |
| 7,913,234 B2 | 3/2011 | Neil et al. | |
| 7,941,783 B1 | 5/2011 | Kishnani et al. | |
| 7,941,790 B2 * | 5/2011 | Cabillic et al. | 717/139 |
| 8,191,039 B2 * | 5/2012 | Cacenco et al. | 717/106 |
| 8,255,886 B2 | 8/2012 | Lachner | |
| 2003/0023953 A1 * | 1/2003 | Lucassen et al. | 717/106 |
| 2003/0208748 A1 * | 11/2003 | Levin et al. | 717/134 |
| 2003/0236657 A1 * | 12/2003 | Ryzl | 703/23 |
| 2007/0113218 A1 | 5/2007 | Nolan et al. | |
| 2007/0220494 A1 * | 9/2007 | Spooner | 717/130 |
| 2008/0126072 A1 * | 5/2008 | Hutchison et al. | 703/25 |
| 2008/0127036 A1 | 5/2008 | Kadur et al. | |
| 2008/0127124 A1 | 5/2008 | Gilfix et al. | |
| 2008/0229274 A1 * | 9/2008 | Cacenco et al. | 717/100 |
| 2008/0307385 A1 * | 12/2008 | Dreiling et al. | 717/108 |
| 2008/0313594 A1 * | 12/2008 | Smith | 717/100 |
| 2009/0125892 A1 | 5/2009 | Crewdson | |
| 2009/0228862 A1 * | 9/2009 | Bertelrud et al. | 717/100 |
| 2009/0249311 A1 | 10/2009 | Dandamudi et al. | |
| 2009/0328000 A1 | 12/2009 | Neil et al. | |
| 2010/0174974 A1 * | 7/2010 | Brisebois et al. | 715/223 |

OTHER PUBLICATIONS

Hayenga et al., Accurate system-level performance modeling and workload characterization for mobile internet devices, Oct. 2008, 7 pages, <http://delivery.acm.org/10.1145/1510000/1509092/p54-hayenga.pdf>.*

Nethi et al., Simulation case studies of wireless networked control systems, Oct. 2007, 5 pages, <http://delivery.acm.org/10.1145/1300000/1298297/p100-nethi.pdf>.*

Seo et al., Automating Embedded Software Testing on an Emulated Target Board, May 2007, 7 pages, <http://delivery.acm.org/10.1145/1280000/1270262/29710009.pdf>.*

(Continued)

*Primary Examiner* — Thuy Dao
(74) *Attorney, Agent, or Firm* — Morris & Kamlay LLP

(57) ABSTRACT

Methods, systems, and apparatus, including computer programs encoded on computer storage media, for creating mobile device applications. In one aspect, a method includes determining that a user has entered one or more user inputs into an integrated development environment, to select or arrange a component that defines a portion of an application, and transmitting interpreter code that corresponds to the component to a mobile device, where the interpreter code, when interpreted by a command interpreter on the mobile device, causes the mobile device to generate a mock-up of the portion of the application defined by the component.

16 Claims, 13 Drawing Sheets

OTHER PUBLICATIONS

"About Scratch," [online], [retrieved on Aug. 20, 2010]. Retrieved from the internet: http://info.scratch.mit.edu/About_Scratch, 1 page.

"About Python," [online], [retrieved on Aug. 20, 2010]. Retrieved from the internet: http://www.python.org/about/, 2 pages.

Staff et al., "An experimental evauation of continuous testing during development," MIT Computer Science & Artifical Intelligence Lab, Jul. 2004, 10 pages.

Goldman et al., "Real-time collaborative coding in a web IDE," MIT CSAIL, Oct. 2011, 10 pages.

H. Behrens, "MDSD for the iPhone: developing a domain-specific language and IDE tooling to produce real world applications for mobile devices," itemis AG, Oct. 2010, 5 pages.

\* cited by examiner

INTERACTION WITH PARTIALLY CONSTRUCTED MOBILE DEVICE APPLICATIONS

BACKGROUND

This specification relates to mobile devices and, in one particular implementation, to a visual programming integrated development environment ("IDE") for developing mobile device applications.

Visual programming interfaces may be used to help novice computer users develop software applications. For instance, Adobe Dreamweaver by Adobe Systems of San Jose, Calif., and Google Sites by Google of Mountain View, Calif., provide visual programming interfaces that allow users to develop web pages without directly manipulating the underlying HyperText Markup Language ("HTML") code.

Other interfaces have been used to teach users the fundamentals of software development. Scratch, a project developed by the Massachusetts Institute of Technology, allows children to develop simple games, animated stories, music, and digital art using a block-based, visual programming language. Alice, a project developed by the Carnegie Melon University, uses a drag-and-drop visual programming interface to introduce basic programming language concepts.

SUMMARY

According to one innovative aspect of the subject matter described by this specification, a user may use a visual programming interface provided by a visual programming IDE to develop applications for personal electronic devices, such as mobile phones, personal digital assistants (PDAs), smartphones, tablet computers, e-book readers, notebook computers, or video gaming systems. The user may select and arrange the components or functional elements that define an application through the visual programming interface, where at least one of the components may access mobile device-specific functionality, such as accelerometer or ringer functionality that is not usually included on a stationary computer. The visual programming IDE may be triggered to generate executable code that implements the application through a signal input by the user through the visual interface, or through the mobile device. The visual programming IDE automatically generates one or more versions of the executable code that implements the application, and provides the executable code to a mobile device or another device for debugging or execution.

According to another innovative aspect, interpreter code may be sent to a command interpreter on the mobile device as a user is interactively and iteratively constructing the application. When interpreted by the command interpreter, the interpreter code may cause the mobile device to display and receive inputs for a mock-up version of the mobile device application before the application it is fully and finally constructed, i.e., before the user triggers the visual programming IDE to generate the executable code.

Another innovative aspect of the subject matter described in this specification may be embodied in methods that include the actions of determining that a user has entered one or more user inputs into an integrated development environment, to select or arrange a component that defines a portion of an application, and transmitting interpreter code that corresponds to the component to a mobile device, where the interpreter code, when interpreted by a command interpreter on the mobile device, causes the mobile device to generate a mock-up of the portion of the application defined by the component.

Other embodiments of these aspects include corresponding systems, apparatus, and computer programs, configured to perform the actions of the methods, encoded on computer storage devices.

These and other embodiments may each optionally include one or more of the following features. For instance, determining that a user has entered one or more user inputs further includes determining that a user has entered one or more user inputs into an integrated development environment running on a client device; transmitting interpreter code that corresponds to the component to a mobile device further includes transmitting interpreter code that corresponds to the component to a mobile device that is connected to the client device; the actions also include receiving a signal indicating that the application is complete or that executable code for the application is to be transmitted to the mobile device; transmitting interpreter code that corresponds to the component to a mobile device further includes transmitting interpreter code that corresponds to the component to a mobile device before receiving the signal indicating that the application is complete or that executable code for the application is to be transmitted to the mobile device; the actions further include, in response to receiving the signal indicating that the application is complete or that executable code for the application is to be transmitted to the mobile device, generating the executable code for the application, and transmitting the executable code for the application to the mobile device; and/or transmitting interpreter code that corresponds to the component to a mobile device further includes iteratively transmitting the interpreter code as the user enters the one or more inputs.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
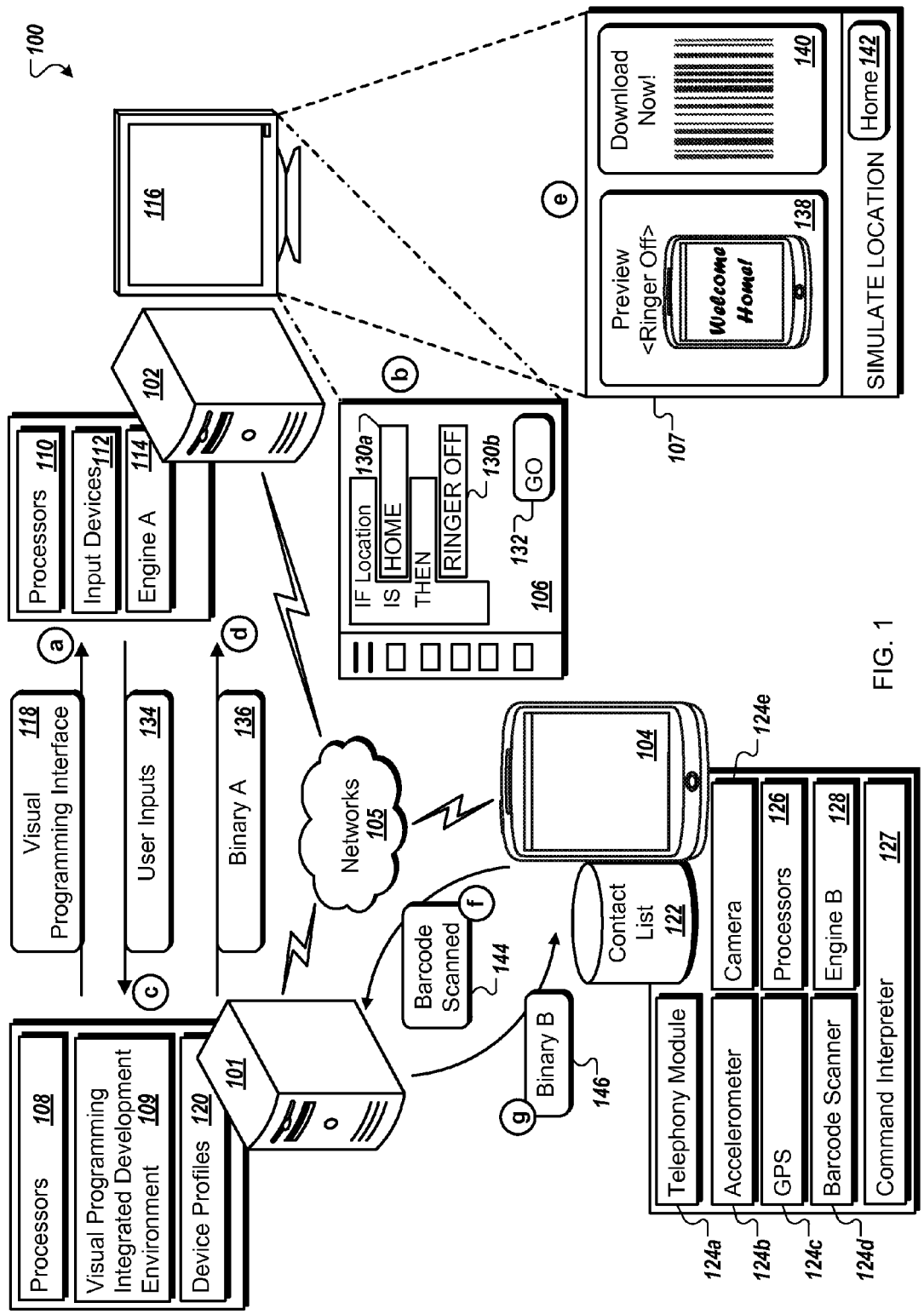
FIGS. 1, 4 and 6A to 6B are diagrams of example systems for developing mobile device applications.

FIG. 1 is a diagram of an example system 100 for developing mobile device applications. Specifically, the system 100 includes a server 101 that includes a back-end, visual programming IDE 109 for developing mobile device applications, a client device 102 that displays a front-end, visual programming interface 118 for developing the mobile device applications, and a mobile device 104 that runs the mobile device applications.

Initially as used by this specification, a "visual programming IDE" refers to a software application (or to a suite of software applications) that provides a comprehensive facility for a user of the system 100 to develop applications. The visual programming IDE may include, for example, a source code editor, a compiler, an interpreter, build automation tools, a debugger, and/or other components. The build automation tools may generate the "visual programming interface" which, as referred to by this specification, is an interface that allows a user to create applications by moving programming building blocks, modules, visual elements, or code nodes (collectively, "components"), to create flowcharts or structure diagrams which are then compiled or interpreted by the visual programming IDE.

The server 101, the client device 102, the mobile device 104 communicate with each other over one or more networks 105. The networks 105 may include a wireless cellular network, a wireless local area network (WLAN) or Wi-Fi network, a telephone network, a Third Generation (3G) or Fourth Generation (4G) mobile telecommunications network, a private network such as an intranet, a public network such as the Internet, or any appropriate combination thereof.

The server 101 may be a web application server or any other computing device that includes one or more processors 108. The server 101 may be implemented in one or more devices, arranged, for example, as a stand-alone server, a server farm, or a server cluster. Among other data, the server 101 stores one or more device profiles 120 that, for example, reference characteristics or capabilities of the different devices included within the system 100, and that identify users that are associated or paired with the different devices. The client device 102 may be any type of computing device that includes one or more processors 110, input devices 112, display devices (e.g., display device 116), and engines (e.g., engine 114). As used by this specification, an "engine" (or "software engine") refers to a software-implemented input/output system that provides an output that is different than the input. An engine may be an encoded block of functionality, such as a library, a platform, Software Development Kit ("SDK") or an object.

The mobile device 104 is any type of portable computing device, such as a cellular phone, e-book reader, tablet computer, music player, smart phone, personal data assistant (PDA), notebook computer, or other mobile device. Similar to the client device, the mobile device 104 includes one or more processors 125 and an engine 128. The engine 128 may be the same type of engine, or a different type of engine, as engine 114. The mobile device 104 also includes a command interpreter 127, which is a computer application that performs instructions that are written in interpreter code. The interpreter code may instruct the command interpreter 127 to, for example, generate a mock-up version of an application that is under development through the visual programming IDE 109. The command interpreter 127 may be, for example, a Perl, Python, MATLAB, Ruby, Lisp, Scheme, or Java interpreter.

Unlike the client device 102, the mobile device 104 includes at least one hardware or software module that provides functionality which is specific to a mobile device. For instance, the mobile device 104 may include a telephony module 124a that provides telephone functionality, an accelerometer 124b that provides motion sensing functionality, a Global Positioning System (GPS) module 124c that provides position sensing functionality, a barcode scanner 124d that provides barcode reading functionality, and/or a camera 124e that provides image sensing functionality. Other hardware or software modules, such as an embedded orientation sensing module, may also be included on the mobile device 104.

The user may interact with the visual programming IDE 109 through the client device 102 to create an application that may be automatically uploaded to the mobile device 104 by the visual programming IDE 109. Among other functionalities, the application may access one or more functional ities that are specific to the mobile device 104, such as telephone, motion sensing, or position sensing functionality. The user who creates the application using the client device 102 may be the same user, or a different user, as the user of the mobile device 104.

As the user interacts with the visual programming IDE 109 to construct the application, i.e., before the user indicates that the application is completed, the visual programming IDE 109 may transmit interpreter code to the command interpreter 127 on the mobile device 107. When interpreted by the command interpreter 127, the interpreter code causes the mobile device 104 to generate an interactive, mock-up version of the application. A user of the mobile device may interact with the mock-up version of the application to troubleshoot or otherwise experience portions of the application before the application is fully complete. In doing so, these portions can be tested, approved, shared or modified before a full, executable version of the application is compiled.

For example, the user may interact with the visual programming IDE 109 by dragging-and-dropping a user interface component (e.g., a control) onto a component pane or preview pane of the visual programming interface. Based on this interaction, interpreter code may be communicated to the command interpreter on the mobile device to cause the mobile device to display the same type of user interface component on a mocked-up user interface, in a portion. Although executable code for the application has not yet been communicated to the mobile device, the user may still interact with the mocked-up user interface by, for example, selecting the user interface component on the mobile device to test or troubleshoot the application. After interacting with the mock-up version of the application, the user may again interact with the visual programming IDE 109 to alter the user interface component in the component pane or the preview pane if they are unsatisfied with the mock-up, or may select or arrange other components that define different aspects or portions of the application if they are satisfied with the mock-up.

Once the user is satisfied that the application is complete, they may select a control to instruct the visual programming IDE 109 to generate a version of the executable code that may be executed on the client device 102. When the client device 102 executes this version of the executable code, a mock-up of the application may be displayed on the client device 102, to appear as though the application were running on the mobile device 104, and the user may interact with the mock-up. In interacting with the mock-up, the user may simulate certain inputs to the application that may be associated with mobile device-specific functionalities, even if the application is being executed on a computing device that may not actually implement these types of functionalities or generate these types of inputs. Once the user signals that they are satisfied with the application, the visual programming IDE 109 may automatically generate a version the executable code that may be executed on the mobile device 104, and may automatically provide this version of the executable code to the mobile device 104.

FIG. 1 also illustrates a flow of data within the system 100 during states (a) to (g), and two screenshots 106 and 107 of the visual programming interface 118 that are displayed on the client device 102 during states (b) and (e), respectively. The states (a) to (g) may be time-sequenced states, or they may occur in a sequence that is different than the illustrated sequence.

In more detail, during state (a), the user uses the client device 102 to log into the visual programming IDE 109 that is executing on the server 101. The visual programming IDE 109 may determine, from logon data or from user or device profiles, the identity of the user, and a type or characteristic of the client device 102. For instance, the visual programming IDE 109 may determine from logon data that the user is using a particular version of a browser. The visual programming IDE 109 may identify the user, and may access the device profiles 120 to identify devices that are paired with the user. For instance, the visual programming IDE 109 may determine from the logon data that, although the user is accessing the visual programming IDE 109 through the client device 102, the user is associated or paired with the mobile device 104.

The visual programming IDE may generate code (e.g., eXtensible Markup Language (XML) or HTML code, or JavaScript) that implements the visual programming interface 118, and that is tailored to the type or characteristic associated with the client device 102. The server 101 streams or otherwise transmits the code to the client device 102 which, during state (b), displays the visual programming interface 118 to the user.

In some implementations, the visual programming interface 118 is rendered within an Internet browser on the display 116, and the code is customized for that browser.

As shown in screenshot 106, the visual programming interface 118 includes drag-and-drop components that may be selected and visually arranged by the user to define an application. The location component 130a may, for example, be selected from a contact list database 122 associated with the mobile device 104. The "ringer off" component is one example mobile device-specific functionality that may be provided by the telephony module 124a of the mobile device 104.

In the screenshot 106, the location component 130a ("Home") and the telephony module component 130b ("Ringer off") have been selected and added to an "if . . . then" statement that makes up a portion of the application. When executed, this portion of the application would cause the ringer of a mobile device to turn "off" when the mobile device infers that it has arrived at a "home" location. Components that are associated with other types of functionality may also be added to the application, such as mobile device-specific functionality related to the accelerometer 124b, the global positioning system (GPS) module 124c, the barcode scanner 124d, or the camera 124e, or functionality that is not mobile device-specific (e.g., "power off" or "enter hibernation mode").

Although only a portion of the application is completed in state (b), the visual programming IDE 109 may send, or may cause the client device 102 to send, interpreter code to the mobile device 104. When interpreted by the command interpreter 127, the interpreter code may cause the mobile device 104 to generate a mock-up version of the application, with which the user may interact before the application is fully completed. If the mobile device 104 is located at "Home," for example, the command interpreter 127 may generate a mock-up of the application that turns off the ringer, or that displays a message on the user interface of the mobile device 104 to indicate that the ringer has been turned off. The visual programming IDE 109 or the client device 102 may determine to send the interpreter code to the mobile device 104 based on a user selection or preference, or based on determining that the mobile device 104 is directly connected to the client device.

During state (c), signals that reflect the user's inputs to, or other interactions with, the visual programming interface 118 are communicated to the visual programming IDE 109. For example, a signal that indicates that the user has selected of a "go" control 132 on the visual programming interface 118 may be transmitted from the client device 102 to the visual programming IDE 109. Interpreter code may be sent to the mobile device before the "go" control 132 is selected, to allow the command interpreter 127 to generate or update a mock-up of the portion of the application that corresponds to the user's inputs to the visual programming IDE 109.

In response to detecting that the user has selected the "go" control 132, the visual programming IDE 109 may, during state (d), generate a first binary executable 136 that is specific to the engine 114 associated with the client device 102. The first binary executable 136 is transmitted from the server 101 to the client device 102, which executes the first binary executable 136, thereby displaying a mock-up of the application. By displaying a mock-up of the application, the user may test and debug the application without having to connect the mobile device 104 to the network, or install a new executable upon the mobile device 104.

In one particular implementation, in addition to generating the first binary executable 136 and transmitting the first binary executable 136 to the client device 102, the visual programming IDE 109 identifies one or more mobile devices (e.g., mobile device 104) that are paired with the user, generates a different binary executables that are specific to those mobile devices, and transmits the different binary executable to the respective mobile devices. In doing so, a mobile device-specific executable may be automatically generated and pushed by the visual programming IDE 109 to a mobile device associated with the user, without requiring the user to interact with the visual programming IDE 109 through the mobile device, and without requiring the user to connect the mobile device to the client device 102 itself. The user may also be prompted, through the visual programming interface 118, to confirm whether they intend for the second binary executable to be pushed to a mobile device that is paired with the user, or other context data (e.g., collocation of the client device 102 and the mobile) device may be used to infer that the user intends to push the second binary executable to the mobile device.

Screenshot 107 shows the visual programming interface 118, as displayed by the client device 102 during state (e). Specifically, the screenshot 107 includes a preview pane 138 that displays the mock-up of the application, as it would appear when executed on the mobile device 104. The preview pane 138 includes a graphic that depicts the mobile device 104, to give the user a sense of how the application will appear on the mobile device 104. The particular graphic to display in the preview pane 138 may be determined from a device profile associated with the mobile device 104.

The user may interact with the controls that are depicted in the preview pane 138 by clicking on or otherwise selecting a control, to simulate selecting a control on the mobile device 104. The server 101 may determine characteristics (e.g., screen dimensions, control layout) of the mobile device 104 from the device profile associated with the mobile device 104, and may alter the mock-up of the application based on these characteristics.

The first binary executable 136 may include code that accepts inputs that the client device 102 may not be capable of generating. Accordingly, the visual programming IDE 109 may provide a capability for the user to simulate these inputs through the client device 102. For instance, while the application would otherwise accept data from a position sensor of a mobile device to determine whether the mobile device is in the "home" location, the first binary executable 136 is configured to accept simulated position sensor data, since the client device 102 may not include position sensing functionality.

The simulated data may be predetermined data, or the user may select the data to simulate. for instance, the visual programming interface 118 may include one or more controls (e.g., a selectable, map control) that, when selected, cause simulated data to be generated and input to the application. For example, a location selection control 142 may be selected by the user to simulate GPS data associated with a particular location, such as an address derived from the contact list database 122. In FIG. 1, for example, the location selection control 142 is associated with data for the location "Home." When the control 142 is selected, the data that is associated with the control 142 is input to the first binary executable 136, to simulate the position sensor data that a mobile device would generate if the mobile device were to arrive at the "home" location. In the situation where the client device 102 is capable of generating a particular input, controls may still be used to simulate data for that input, for example to substitute simulated data for data that the client device 102 is actually generating.

If the visual programming IDE 109 has not already pushed the second binary executable 146 to the mobile device 104 (e.g., based on the mobile device 104 being paired with the user and further based on the user selecting the "go" control 132), the visual programming IDE generates a symbol (e.g., a quick response (QR) code or a bar code) that may be used to identify the application, and provides the symbol to the client device 101 for display in the download pane 140. The user may scan the symbol displayed in the download pane 140 (e.g., using the barcode scanner 124*d* or an image generating module, such as the camera 124*e*), to indicate that the application is to be pushed or transmitted from the server 1012 to the mobile device 104. If the visual programming IDE 109 has already pushed the second binary executable 146 to the mobile device 104, scanning the symbol may result in the visual programming IDE 109 sending an update version of the second binary executable 146 to the mobile device 104, or otherwise confirming that the push of the second binary executable is or was acceptable to the user.

During state (f), the barcode data 144 generated by the mobile device 104 is communicated from the mobile device 104 to the server 101. The barcode data 144 may, for instance, reference the user, the application, the client device 102, the mobile device 104, the first binary executable 136, or the second binary executable 146. The visual programming IDE 109 may use the barcode data 144, or other data that identifies the mobile device 104, to generate, as the second binary executable 146, a version of the application that is tailored to the hardware or software configuration of the mobile device 104.

During state (g), the server 101 communicates the second binary executable 146 to the mobile device 104. The second binary executable 146, for example, may be automatically installed upon the mobile device 104, or the mobile device 104 may prompt the user regarding installation. Because the transmission of the barcode data 144 may establish a direct network connection between the mobile device 104 and the server 101 that is independent of the network connection between the server 101 and the client device 102, the second binary executable 146 may be communicated directly between the mobile device 104 and the server 101 without being communicated to, or through, the client device 102 itself.

Figure 2A:
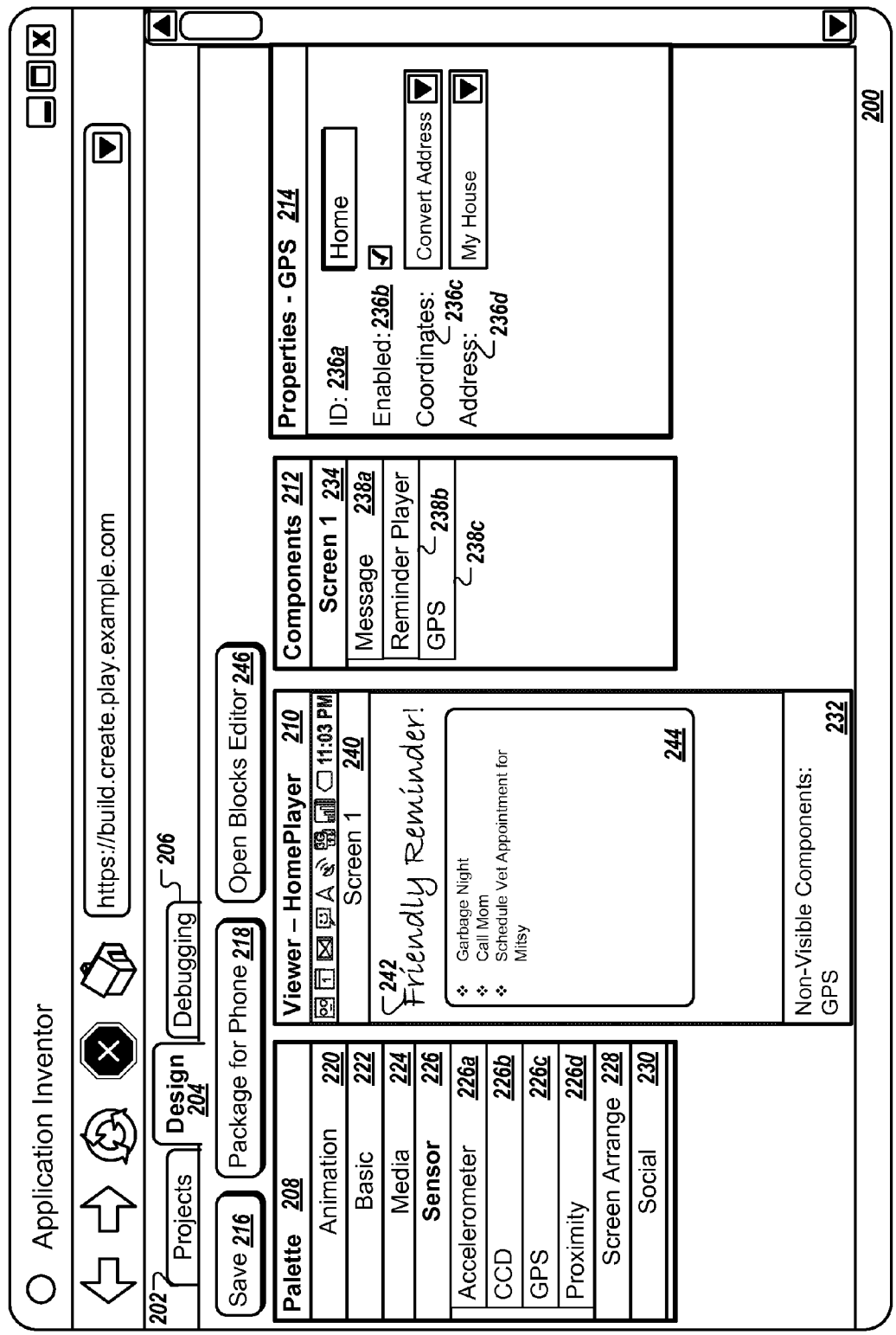
FIGS. 2A through 2D are example screenshots of a visual programming interface that may be used for developing mobile device applications.
Figure 2B:
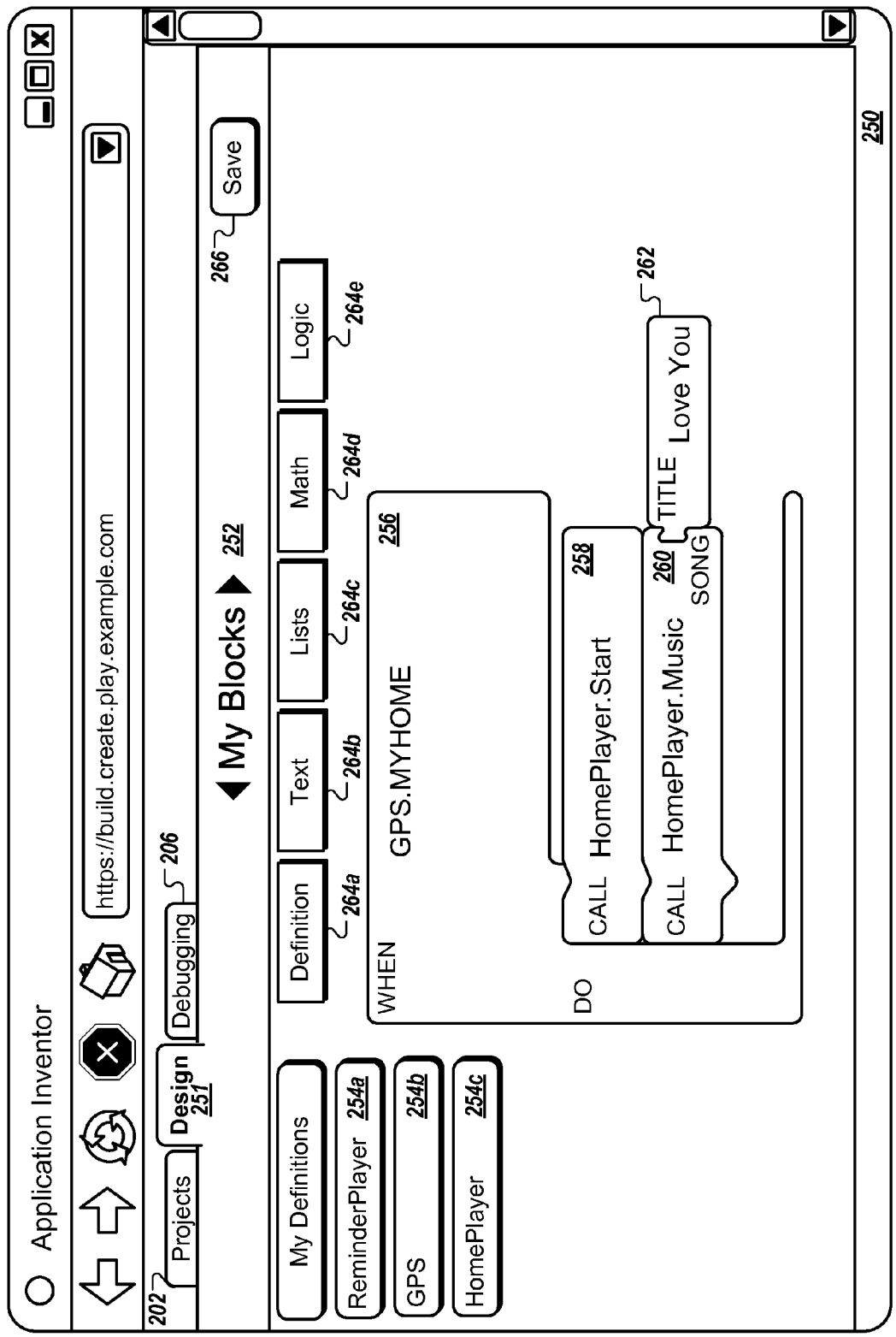

FIGS. 2A and 2B are example screenshots of a visual programming interface that may be used for developing mobile phone applications. In general, a user may use the visual programming interface to create new applications for a mobile device, or to modify an existing application, by dragging and dropping components associated with various application functionality into a web-based workspace.

As shown in FIG. 2A, a screenshot 200 shows the design screen of a web-based visual programming interface. The interface includes a projects tab 202, a design tab 204 (currently active), and a debugging tab 206. In general, through the projects tab 202, a user may access a previously completed or current project (e.g., application development) or begin a new development project. Using the design tab 204, the user may define a mobile device application with one or more components selected from a components palette 208. The mobile device application may be visualized using a preview window 210. If the mobile device application is not functioning as desired, the user may access the debugging tab 206 to locate and fix any errors.

When working in the design tab 204, for example, the user may review mobile device components in the components palette 208 and place any selected components into a components pane 212 or the preview window 210. A user may then set properties related to one or more of the selected components using a properties pane 214. As the user selects or arranges the components in the components pane 212 or the preview window 210, interpreter code may be transmitted to a mobile device to allow a command interpreter on the mobile device to generate a mock-up of the application, or of the portion of the application defined by the selected components. Once the user has finished working on the current development project, the user may select a save button 216 to save the project or a package to phone button 218 to generate executable code for use on a mobile device.

The components palette 208 presents a list of components or features of a mobile device that the user may add to a new mobile device application. The components and features are categorized into the following headings: animation 220 (e.g., graphics features), basic 222 (e.g., menus, buttons, icons, telephony functionality), media 224 (e.g., audio, video, ringer functionality), sensor 226 (e.g., external data collection), screen arrangement 228 (e.g., zones, panes, navigation, touch response), and social 230 (e.g., social networking, texting). Other categories or components are possible, such as digital camera functionality, personal information management functionality (e.g., involving a personal information manager tool on the mobile device), or other embedded module functionality. The sensor heading 226 has been selected, and the individual sensor components, including an accelerometer 226*a*, a light indicator (CCD) 226*b*, a global positioning system (GPS) 226*c*, and a proximity sensor 226*d* are visible.

The GPS sensor component 226*c*, for example, has been selected by the user, either through adding it to the preview window 210 or the components pane 212. The GPS sensor component is listed within a non-visible components section 232 of the preview window 210 as well as within the components pane 212. The properties of the GPS sensor component 226*c* are available within the properties pane 214. These properties include an identification property 236*a* selected as "Home," an enabled checkbox 236*b* (affirmative), a coordinates drop-down menu 236*c* set to "convert address", and an address drop-down menu 236*d* set to "my house." The identification property 236*a*, for example, may be used to identify this GPS setting from any other GPS settings potentially used by the same mobile device application or application project. The GPS coordinates may be selected by retrieving an address (e.g., through the personal information management functionality of the mobile device) and having the mobile device or the online development tool generate coordinates corresponding to the selected address. In another example, the user may directly input GPS coordinates.

The application being developed within the screenshot 200, for example, may correspond to a message and to-do list triggered by the mobile device returning home. The components pane 212 lists a series of components associated with a first screen 234. In some implementations, the application may span multiple screens of information. In addition to a GPS component 238c, the first screen 234 includes a message component 238a and a reminder player component 238b.

In the preview window 210, a first screen 240 (e.g., corresponding to the first screen 234) includes a message 242 "friendly reminder" (e.g., corresponding to the message component 238a) and a reminders region 244 (e.g., corresponding to the reminder player component 238b). The reminder player component 238b, in some implementations, corresponds to a module created by the user. For example, the user may select an open blocks editor button 246 to define the behavior of one or more of the components included in the mobile device application. Even before the user has finished programming the application, a mock-up of the application may display a user interface that is similar to the first screen 240, on the display of the mobile device. This mock-up may be generated when a command interpreter on the mobile device interprets interpreter code corresponding to the application (or portions thereof) or the components 238.

As shown in FIG. 2B, a screenshot 250 includes an example visual programming interface for developing mobile device applications. A design tab 251 includes a "my blocks" user interface 252. The user interface 252, for example, may be accessed by selecting the open blocks editor button 246, as described in relation to FIG. 2A. At the left of the user interface 252, a set of user definitions 254 are available for selection, including a REMINDERPLAYER definition 254a, a GPS definition 254b, and a HOMEPLAYER definition 254c. The user definitions 254, in some implementations, include sets of information related to a user-defined application module. For example, in selecting a user definition, sub-events, such as files within a folder, may be made available to the user. These sub-events may describe specific property settings or conditions for each definition.

The HOMEPLAYER definition 254c, for example, is open for editing within the user interface 252. The HOMEPLAYER module may be activated by a when block 256 labeled "GPS.MY-HOME". For example, when the GPS sensor within the mobile device determines that the mobile device has reached the user's home address, the HOMEPLAYER module is activated. Two call blocks 258 and 260 have been added to the when block 256. The first call block 258 is labeled "HOMEPLAYER .Start", and the second call block 260 is labeled "HOMEPLAYER.Music" of type song. Connected to the second call block 260 is a title block 262 labeled "Love You". When running the HOMEPLAYER module, for example, upon returning home, the mobile device may automatically begin to play the song "Love You".

In generating a module such as the HOMEPLAYER module, the user may select from a series of functional blocks 264 including a definition block 264a, a text block 264b, a lists block 264c, a math block 264d, and a logic block 264e. These blocks, for example, may correspond to variable types or function calls within a programming language. For example, when rendering a title to the screen or passing a file name to a function such as the mobile device audio player, the user may select and customize the text block 264b. As the user selects the functional blocks 264, the visual programming IDE may sent interpreter code to the mobile device to allow the mobile device to generate a mock-up or preview version of the application.

Once the user has finished editing the HOMEPLAYER module, the user may select a save button 266 to save the module and return to the design tab 204 displayed in relation to FIG. 2A. In some implementations, rather than opening within the same browser window, the user interface 252 is displayed within a separate browser tab or within a pop-up window or additional browser application, allowing the user to switch between the blocks user interface 252 and the design tab 204 described in relation to FIG. 2A while defining a new mobile device application.

Figure 2C:
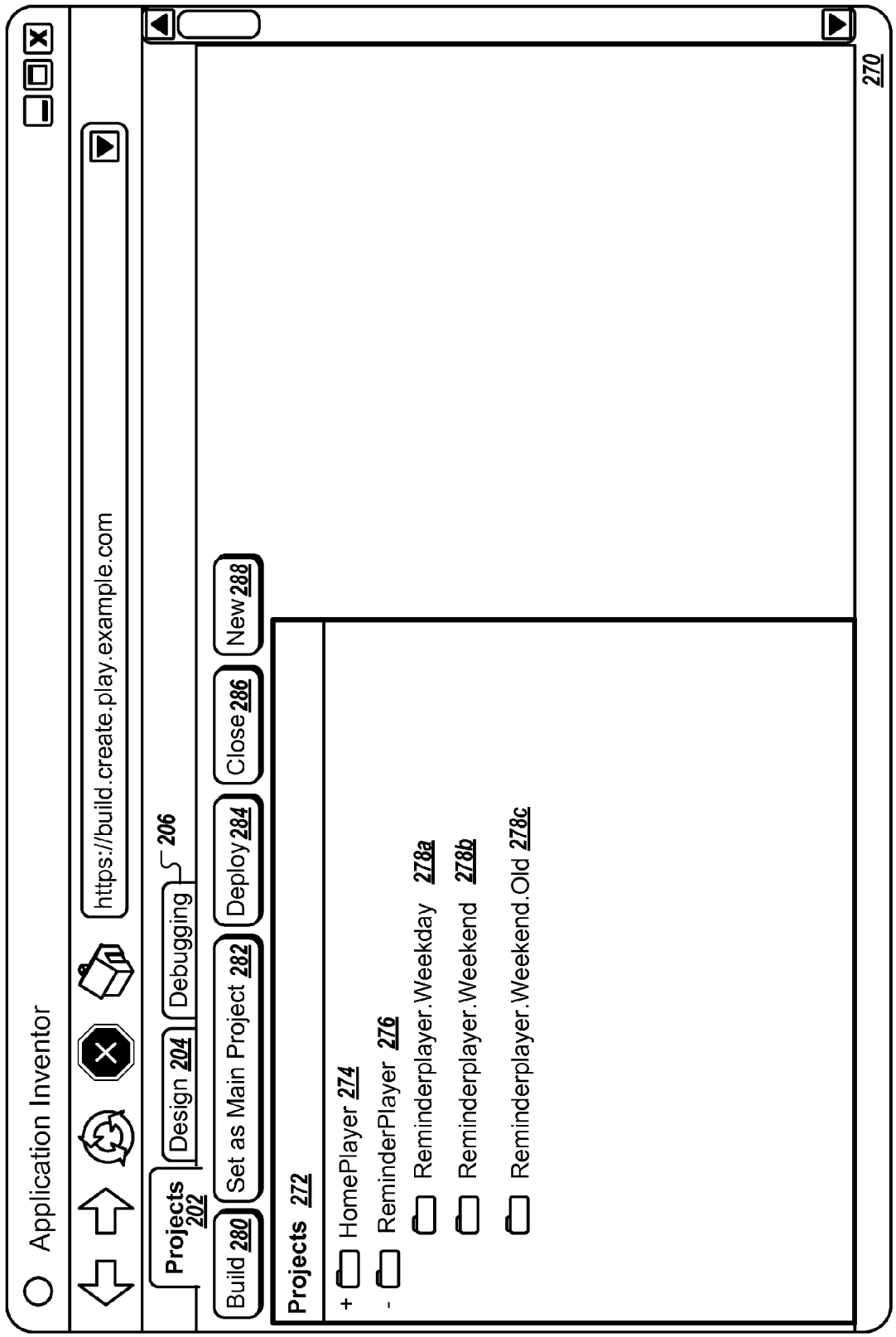

As shown in a screenshot 270 in FIG. 2C, selection of the projects tab 202 navigates the user to a projects directory 272 containing a HOMEPLAYER project 274 and a REMINDERPLAYER project 276. The REMINDERPLAYER project 276 includes three sub-projects: REMINDERPLAYER .WEEKDAY 278a, REMINDERPLAYER .WEEKEND 278b and REMINDERPLAYER .WEEKEND.OLD 278c. A user, for example, may visit the project directory 272 to open, delete, rename, reorganize, or download one or more projects.

A series of buttons are available above the project directory 272. A build button 280, when selected, may build a mock-up version in a preview window of the mobile device application defined by the selected project. The user may verify functionality of the project in the preview window prior to deploying the mobile device application to a mobile device. A "set as main" project button 282 may set the selected project as the default project, making the project immediately available whenever the user accesses the web-based visual programming interface. A deploy button 284 may be used to generate executable code related to the selected project. The executable code, for example, may be uploaded to a mobile device. A close button 286 may be used to close the selected project. A new button 288 may be used to create a new project in the project directory 272. If the user has selected an existing project, for example, the new project may be created as a sub-project of the existing project. A sub-project, in some implementations, may inherit the user-designed modules, screen layout, and component selection(s) associated with the parent project.

Figure 2D:
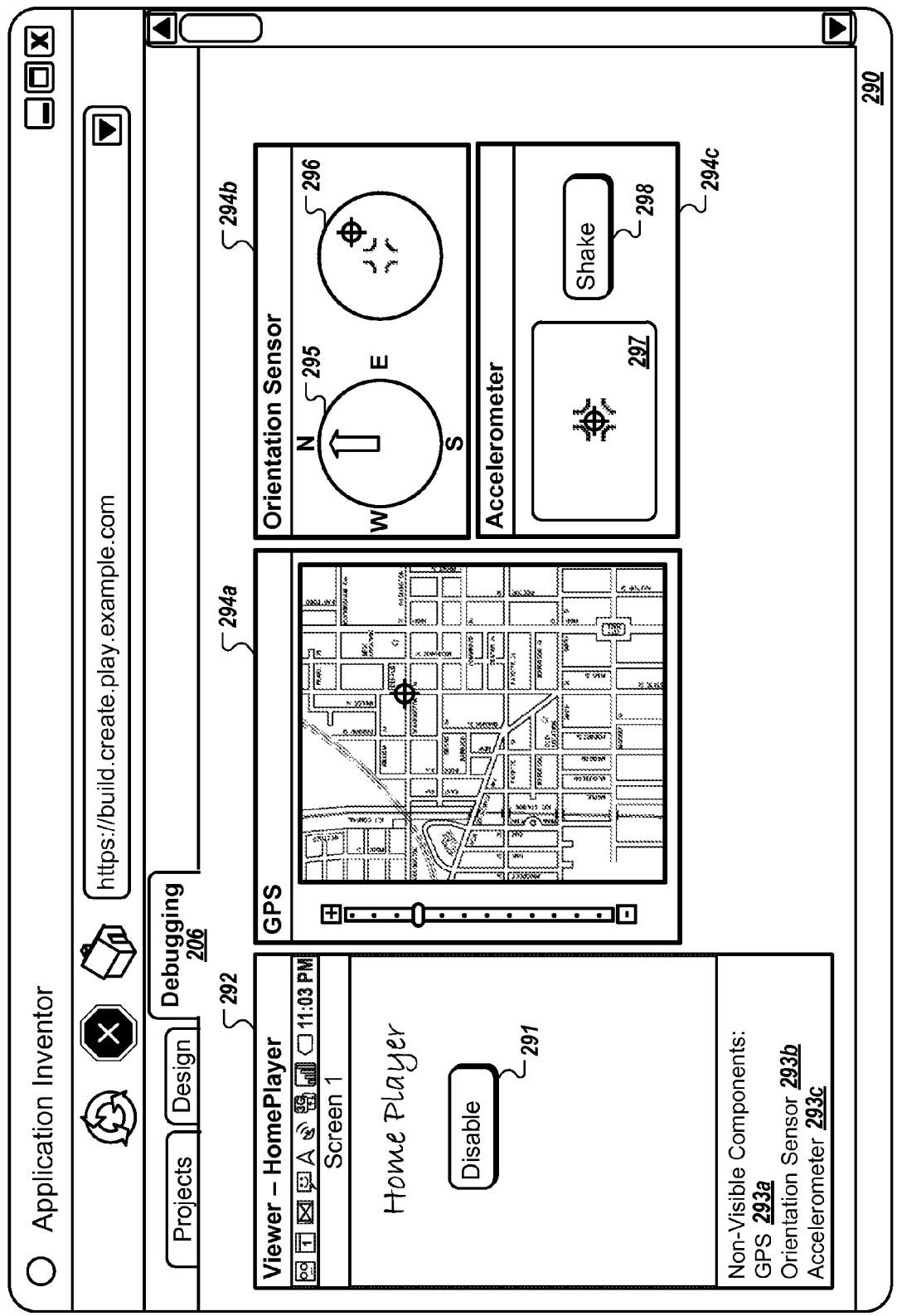

FIG. 2D is a screenshot 290 illustrating the debugging screen of a web-based visual programming interface. The debugging tab 206 has been selected. A preview pane 292 provides the user with a mock-up of a mobile device application recently designed by the user. The user may interact with the mock-up version to verify functionality or to debug any problems. In some implementations, the mock-up version may be generated using a different binary executable than the application which would be installed upon a mobile device. For example, functionality available through a mobile device, such as text messaging functionality, accelerometer functionality, telephone functionality, bar code reading functionality, ringer functionality, position determination functionality, embedded module functionality, proximity sensor functionality, light detection functionality, orientation sensing functionality, camera functionality, personal information management functionality, or social networking functionality may be simulated through code substituted or added into a binary executable version generated to execute within a visual programming IDE. The simulation may include one or more input boxes or user controls for providing inputs typically received externally from a mobile device or through sensor data.

The preview pane 292 includes a message "HOMEPLAYER" and a disable button control 291. Beneath the screen mockup, a set of non-visible components 293 is listed, including a GPS component 293*a*, an orientation sensor component 293*b*, and an accelerometer component 293*c*. The non-visible components 293 each map to a component emulator, such as a GPS emulator 294*a*, an orientation emulator 294*b*, and an accelerometer emulator 294*c*. The user may interact with the controls within each of the emulators 294 to simulate inputs to the non-visible components 293.

Using the GPS emulator 294*a*, the user may select a location on a map to provide GPS coordinates to the mock-up application displayed in the preview pane 292, simulating data received from the GPS component 293*a*. In some implementations (not illustrated), an address could be entered, coordinates could be directly entered, or an address could be selected from a personal information management module, such as a contacts database available through the mobile device. In addition to a static location, in some implementations (not illustrated), the user may select a route between two locations. The route, for example, may include an average speed.

The orientation emulator 294*b* emulates events received from the orientation sensor component 293*b*. The user may interact with a compass control 295 to set a direction and a tilt control 296 to simulate a tilt. For example, using the tilt control 296, selection above center may indicate forward, selection below center may indicate backwards, and selection to the left or right of center may indicate tipping the mobile device to the left or the right.

The accelerometer emulator 294*c* simulates events generated by the accelerometer component 293*c*. An acceleration window 297 may be used to select forward, backward, or sideways acceleration, depending upon the position of the user activation in relation to the center point. The further from the center point, for example, the faster the resultant acceleration input. The user may instead or additionally select a shake button 298 to simulate shaking the mobile device.

In addition to graphical display controls and the emulators 294, in some implementations, physical controls, such as buttons or navigation controls available on a mobile device, may be displayed as part of the mock-up in the preview pane 292 (not illustrated). For example, the user could verify functionality when selecting characters on a keypad of a mobile device or when triggering a call button.

Figure 3A:
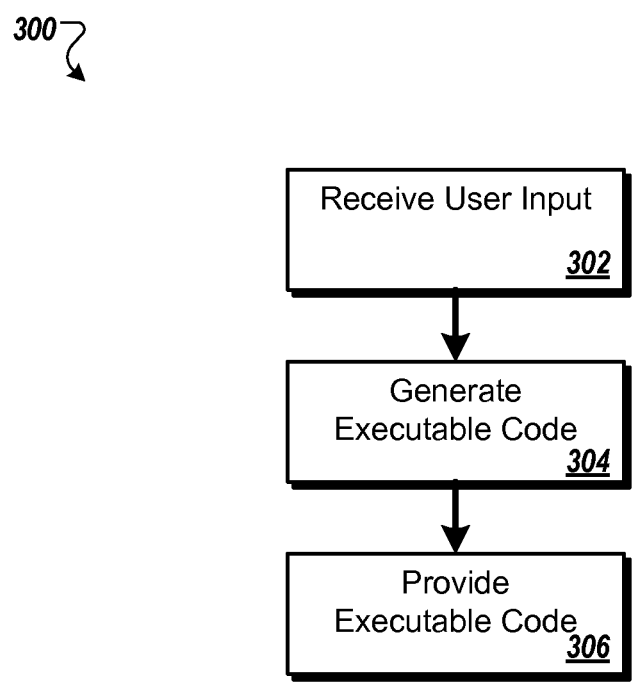
FIGS. 3A through 3C and 7 are flow charts of processes for developing mobile device applications.

FIG. 3A is a flow chart of a process 300 for developing mobile device applications. Briefly, the process 300 may be used in creating new mobile device applications or modifying existing mobile device applications using a web-based visual application development tool.

The process begins with receiving user input through a visual programming interface (302). One or more of the user inputs, for example, may involve selecting and arranging components that define an application for a mobile device. At least one of the components may access functionality that is specific to mobile devices such as, in some examples, accelerometer functionality, telephone functionality, text messaging functionality, bar code reading functionality, position determination functionality, proximity detection functionality, light detection functionality, social networking functionality, camera functionality, or personal information management functionality.

In some implementations, the visual programming interface may include a web-based visual programming interface. For example, a user working at a computing device may access a mobile device application development tool through a network connection. The development tool, in some implementations, may include a preview window that displays a mock-up of the application that the user is currently developing, demonstrating how the application may appear on a mobile device. The development tool may also transmit interpreter code to the mobile device, for example if the mobile device is connected to the computing device or if the user instructs the development tool to transmit the interpreter code. When interpreted by an interpreter on the mobile device, the interpreter code causes the mobile device to generate a mock-up version of the application on the mobile device, that the user may interact with before finishing development of the application.

Executable code is generated (304). The user, after arranging the components defining the application, may choose to build an executable code version of the defined application for use with a mobile device. The executable code may be stored within a networked storage device (e.g., controlled by the system providing the web-based development tool) or locally at the user's computing device. In some implementations, the executable code includes installation functionality as well as the application functionality. One or more versions of the executable code may be generated for a particular application under design, for instance to provide different versions of the executable code to be run on systems with different characteristics.

In some implementations, along with generating the executable code, a quick response code uniquely identifying the application may be generated. The quick response code may be provided to the mobile device to allow the mobile device access to the executable code, for example, stored within the networked system.

Executable code is provided to a mobile device (306). If the executable code is stored within a local storage, the mobile device may be connected to the user's computing device to upload the executable code. If the executable code is stored within a networked drive, the mobile device may be used to access the web-based system and retrieve the executable code. If a quick response code was generated, the user may provide the mobile device with the quick response code, and the mobile device may be used to access executable code using the quick response code.

In some implementations, the quick response code is generated on the display of the user's computing device as a bar code image. The user may scan the bar code, for example using a bar code scanner or a digital camera built into the mobile device. After scanning the bar code, the user may access a networked resource (e.g., through a URL) to retrieve the executable code using the quick response code. In other implementations, the executable code is provided to a mobile device that the visual programming IDE identifies as being paired with the user.

Once the executable code has been transferred to the mobile device, the executable code may be installed to run the application. For example, the application may appear within an application menu or a collection of icons in the display area of the mobile device.

Figure 3B:
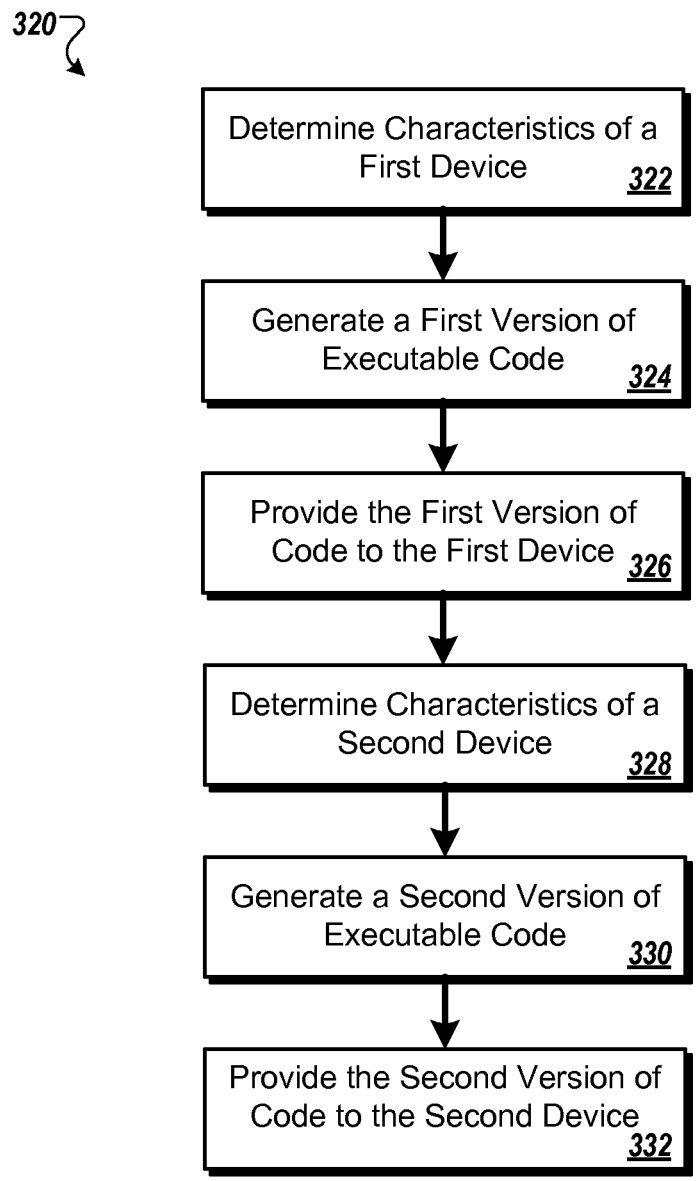

FIG. 3B is a flow chart of a process 320 for developing mobile device applications. Briefly, the process 320 may be used in creating binary executable code for previewing or running mobile device applications designed using a web-based visual application development tool. The binary executable code, for example, may be generated by a visual programming IDE.

The process 320 begins with determining characteristics of a first device (322). For example, it may be determined that a mobile device application is going to be executed in a browser environment of a non-mobile computing device. Further, hardware, software, or firmware characteristics of the first device, in some implementations, may be determined.

A first version of executable code is generated based on the characteristics of the first device (324). For example, a browser-specific version of executable code may be generated. The executable code may simulate a mobile device application.

The first version of executable code is provided to the first device (326). The first version of executable code may be downloaded to the first device. Alternatively, the first version of executable code may be streamed to a virtual runtime environment on the first device from an application server. Other implementations are possible.

Characteristics of a second device are determined (328). For example, it may be determined that the application is going to be executed in a mobile device operating system environment. Additionally, a device model, operating system version, hardware characteristics, firmware characteristics, or software module installations may be determined. In some implementations, the characteristics of the second device may be determined through device information provided by the first device or the second device. A device profile associated with the user or the particular device registered to the particular user, in some implementations, may be accessed to determine characteristics of the second device.

A different, second version of executable code is generated (330). For example, a mobile device operating system-specific version of the executable code may be generated. The executable code, in some implementations, may be generated to be compatible with particular hardware and software components available on the second device.

The second version of executable code is provided to the second device (332). In some implementations, the second version of executable code may be provided to the second device by a visual programming IDE through a network. The second version of executable code, in some implementations, may be downloaded to the second device from the first device.

In some implementations, characteristics of both the first device and the second device may be considered when generating the first version of executable code. For example, the first version of executable code may include a mockup of the particular physical control layout of the second device, as well as visible and non-visible components available to the second device.

Figure 3C:
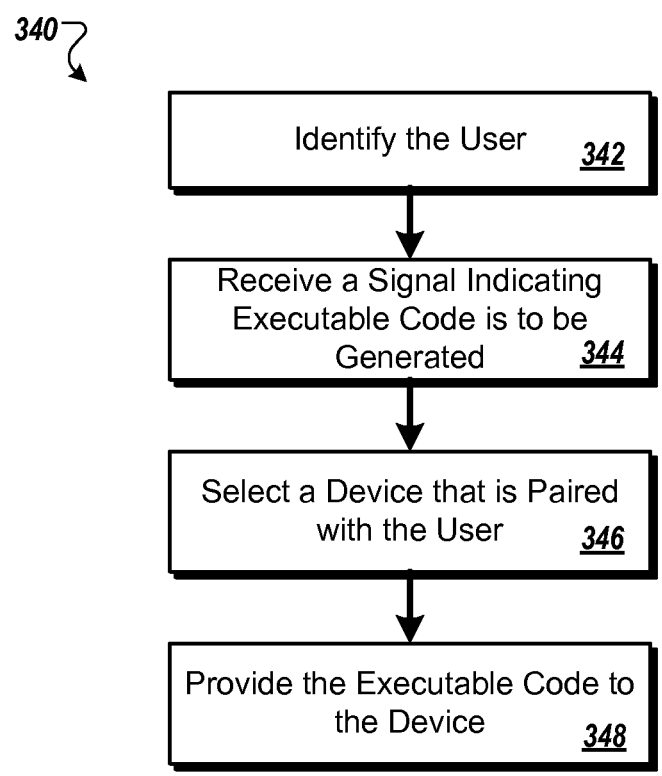

FIG. 3C is a flow chart of a process 340 for developing mobile device applications. Briefly, the process 340 may be used in creating binary executable code for running mobile device applications designed using a web-based visual application development tool. The binary executable code, for example, may be generated by a visual programming IDE.

The process 340 begins when the visual programming IDE identifies the user (342). For example, the user may log into the web-based visual application development tool with user account settings, such as a user name and password. In another example, identification provided in a message from a client device, such as an account number, telephone number, or IP address, may be used to identify the user of the device. The user, for example, may have device profile settings associated with one or more devices.

A signal is received indicating that the executable code is to be generated (344). For example, the visual programming IDE may determine that the user has selected a control on the visual programming interface of the client device to indicate that the executable code is to be generated. In another example, the visual programming IDE may determine that the user has selected a control on a mobile client device to indicate that the executable code is to be generated. In another implementation the executable code may be dynamically generated as the user selects and arranges components on the visual user interface. Before receiving the signal, the visual programming language may iteratively send interpreter code that allows an interpreter on the mobile device to generate a mock-up version of the application, as the application is being programmed by the user.

The visual programming IDE identifies a mobile device that is paired with the user (346). For example, information regarding the mobile device may be linked to a user profile account in the visual programming IDE. The mobile device may or may not be connected to the client device that is displaying the visual programming interface.

In addition to or instead of generating a first binary executable and transmitting the first binary executable to the client device, the visual programming IDE identifies one or more mobile devices that are paired with the user, generates a different binary executables that are specific to those mobile devices, and transmits the different binary executable to the respective mobile devices. In doing so, a mobile device-specific executable may be automatically generated and pushed by the visual programming IDE to a mobile device associated with the user, without requiring the user to interact with the visual programming IDE through the mobile device, and without requiring the user to connect the mobile device to the client device itself. The user may also be prompted, through the visual programming interface, to confirm whether they intend for the second binary executable to be pushed to a mobile device that is paired with the user, or other context data device may be used to infer that the user intends to push the second binary executable to the mobile device.

The executable code is provided to the second client device (348). The executable code, for example, may be downloaded to the second client device from the visual programming IDE. Downloading may occur with or without requiring the user to explicitly authorize the download, depending upon whether the user has opted to authorize this service.

Figure 4:
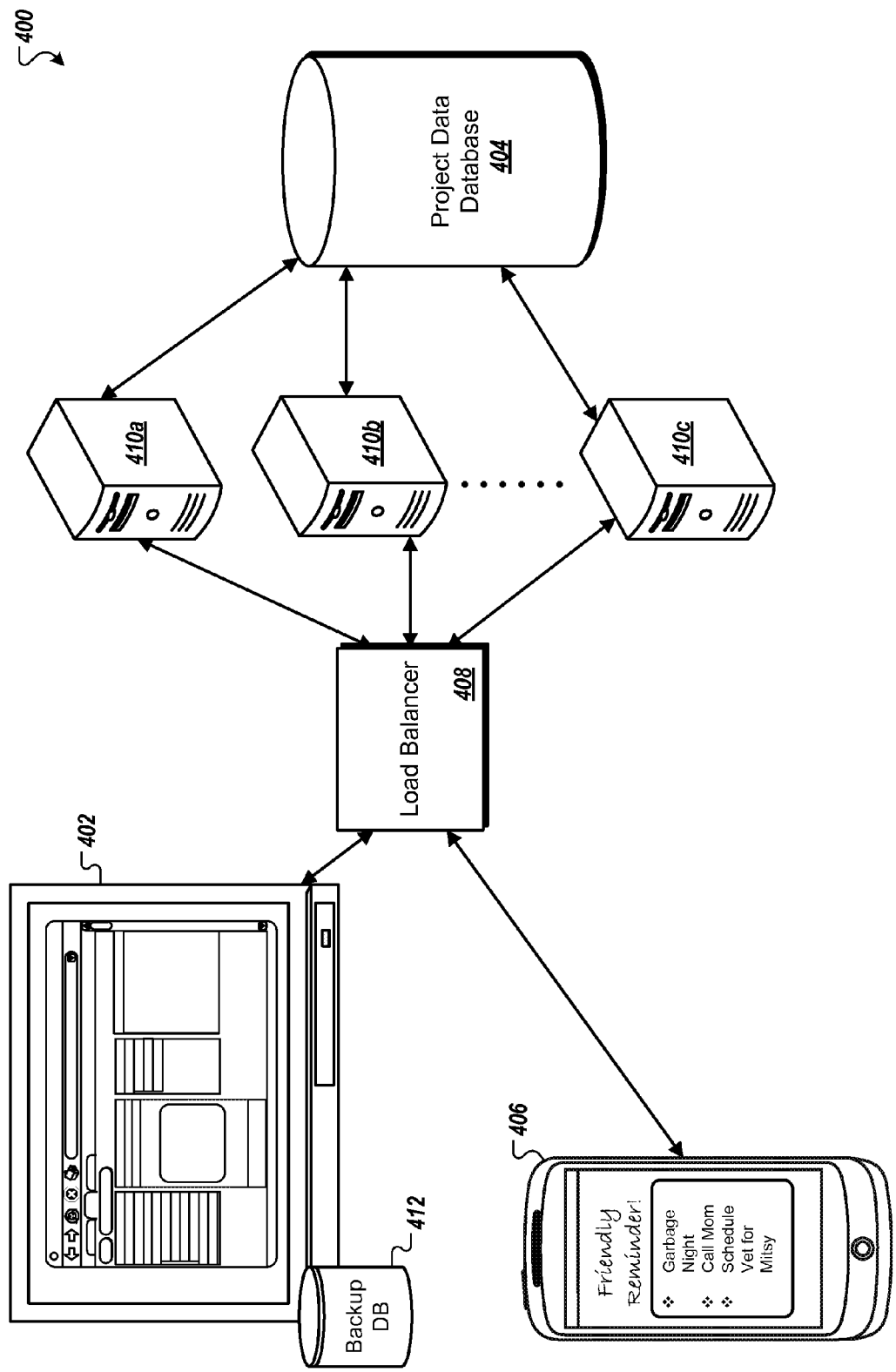

FIG. 4 is a diagram of an example system 400 for developing mobile device applications. Briefly, the system 400 provides a browser-based user interface for generating new mobile device applications. A user, working at a first client device 402, may access a web site for developing mobile device applications. The web site may include a visual programming interface that presents the user with one or more components that may be used to access functionality of the mobile device. These components, in some examples, may include digital camera functionality, sensor functionality, or telephony functionality. As the user designs the new application, the resultant mobile device application project may be stored remotely within a project data database 404. Once the user has completed development of the new mobile application, the application may be downloaded to a second client device 406. A user may gain access to the system 400, for example, through registering the second client device 406 with the device manufacturer and joining an online mobile device application development community. In another example, the system 400 may be presented within a classroom setting to introduce students to basic telecommunications technologies and mobile communication features.

The web site accessed by the user may include an visual programming IDE which allows a user having basic understanding of software development principles to build a mobile device application. Through the application development process, the user may access the underlying capabilities of the second client device 406, using these features in new combinations and with new outcomes. For example, the user may drag and drop mobile device components or features into a workspace. The user may specify within the workspace an interrelation between the device components or features. For example, the user may select graphics, multimedia, sensors, social networking, or other mobile device capabilities. The user may arrange the components to interact using a visual programming interface. If a user has trouble recognizing incoming calls when the user's phone is in her purse, for example, the user may access data collected by a light detection sensor, such as a charge-coupled device (CCD) sensor, to create an application which automatically adjusts the volume of the ringtone when the device has been placed in a dark location (e.g., a pocket or purse).

In some implementations, the user may test a mock-up of the mobile device application on the first client device 402 within a preview window. For example, a mock-up version of the application designed by the user may be generated for testing and verification prior to uploading the mobile application to the second client device 406. The preview window may include one or more controls, such as icons or buttons, used to simulate sensor input. For example, a shake button may be activated to simulate shaking the mobile device.

To meet the needs of multiple developers within the system 400, while ensuring fast and dependable interaction for each user interfacing with the visual programming IDE, the system 400 may include a load balancer 408 distributing data traffic between each computing device, such as the first client device 402, and multiple data servers 410. The load balancer 408 may include hardware, software, or a combination thereof functioning to distribute requests for the mobile application development tool received from multiple users on multiple computing devices. In some implementations, the load balancer 408 may include a multi-layer switch or a domain name system (DNS) server capable of distributing traffic to the data servers 410 with high availability and failover.

The data servers 410 may supply information to the visual programming IDE running upon the first client device 402, and may store project information for the user in the project data database 404. The project information, for example, may include ongoing and previously developed applications and user-designed components (e.g., a widget, graphic, audio file, or other component which the user may include in one or more application projects). The project data database 404 may include one or more digital storage devices, physically connected or inter-networked. In some implementations, a user may store ongoing projects or previously developed projects locally as well within a backup database 412.

In some implementations, the user may connect to the system 400 using the second client device 406 to download an application. For example, the user may point the second client device 406 to the uniform resource locator (URL) of the visual programming IDE or an associated site where the user may retrieve executable code corresponding to the newly developed mobile device application.

The second client device 406, in some implementations, may be provided with a quick response code for use in downloading the executable code. For example, once the mobile application has been compiled into executable code for use by the second client device 406, the visual programming IDE may render a bar code upon the display of the first client device 402 corresponding to the executable code. The user may scan the bar code using the second client device 406 to collect the quick response code. The second client device 406 may then retrieve executable code from the project data database 404 using the quick response code and install the new mobile device application.

If the mobile device has been registered in relation to a user account in the online development environment, in some implementations, the user may select a download control within the user interface to push the application to the registered mobile device. For example, upon selection of a "download app" button, a compiled binary executable may be transmitted from the data servers 410 to the second client device 406.

If the project data has been stored to a backup database 412, the user may connect the second client device 406 to the first client device 402 or the backup database 412 to retrieve the executable code. In some examples, the second client device 406 may be tethered to the first client device 402 using a USB cable or wirelessly connected using Bluetooth or radio frequency (RF) communications.

Upon receiving the executable code, the mobile application may be executed on the second client device 406. For example, the application may be launched from a list of applications in an application menu or as a selectable icon upon the display of the second client device 406.

Although the system 400 has been described in relation to developing new applications, in some implementations, the user may choose to modify an existing application. For example, the user may select an existing application, either professionally developed or developed by a different user of the system 400 (e.g., a friend or a member of an online mobile device application development community). The selected application may be modified by the user prior to installing the application upon the second client device 406. In some implementations, the visual programming IDE may include a collection of example mobile device applications.

Figure 5:
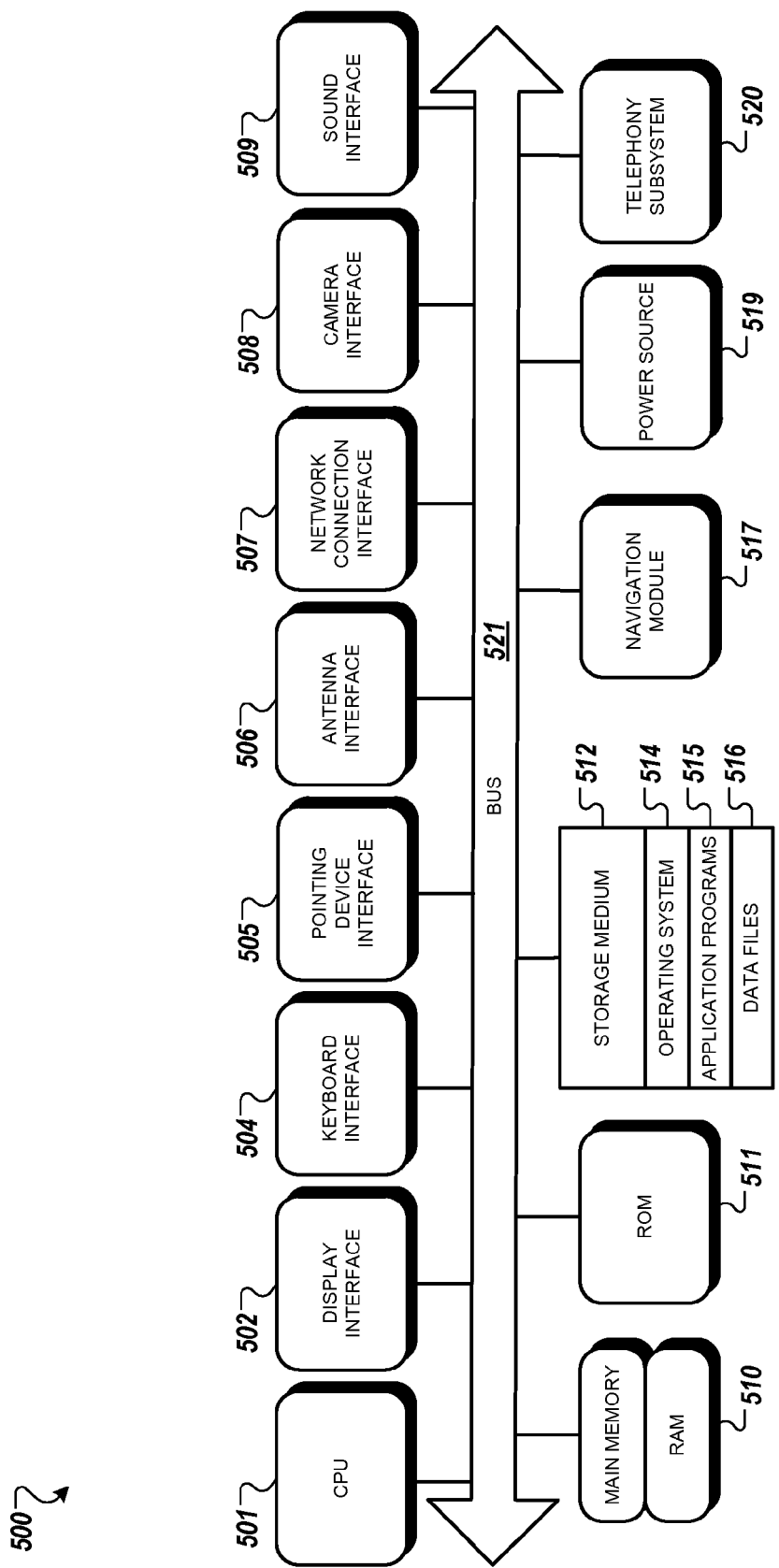
FIG. 5 is a block diagram of an example internal architecture.

FIG. 5 is a block diagram illustrating an example internal architecture 500 of the second client device 406. The architecture includes a central processing unit (CPU) 501 where the computer instructions that comprise an operating system or an application are processed; a display interface 502 that provides a communication interface and processing functions for rendering video, graphics, images, and texts on the display of the second client device 406, provides a set of built-in controls (such as buttons, text and lists), and supports diverse screen sizes; a keyboard interface 504 that provides a communication interface to a keyboard input device; a pointing device interface 505 that provides a communication interface to a pointing input device; an antenna interface 506 that provides a communication interface to an antenna; a network connection interface 507 that provides a communication interface to a network; a camera interface 508 that provides a communication interface and processing functions for capturing digital images from a built-in camera; a sound interface 509 that provides a communication interface for converting sound into electrical signals using a microphone and for converting electrical signals into sound using a speaker; a random access memory (RAM) 510 where computer instructions and data are stored in a volatile memory device for processing by the CPU 501; a read-only memory (ROM) 511 where invariant low-level systems code or data for basic system functions such as basic input and output (I/O), startup, or reception of keystrokes from the keyboard are stored in a non-volatile memory device; a storage medium 512 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 514, application programs 515 (including, for example, a web browser application, a widget or gadget engine, and mobile applications created using the system 400) and data files 516 are stored; a navigation module 517 that provides a real-world or relative position or geographic location of the second client device 406; a power source 519 that provides an appropriate alternating current (AC) or direct current (DC) to power components; and a telephony subsystem 520 that allows the second client device 406 to transmit and receive sound over a telephone network. The constituent devices and the CPU 501 communicate with each other over a computer bus 521.

The CPU 501 may be one of a number of computer processors. In one arrangement, the computer CPU 501 is more than one processing unit. The RAM 510 interfaces with the computer bus 521 so as to provide quick RAM storage to the CPU 501 during the execution of software programs such as the operating system application programs, and device drivers. More specifically, the CPU 501 loads computer-executable process steps from the storage medium 512 or other media into a field of the RAM 510 in order to execute software programs. Data is stored in the RAM 510, where the data is accessed by the computer CPU 501 during execution.

The storage medium 512 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the second client device 406 to access computer-executable process steps, application programs and the like, stored on removable and non-removable memory media, to off-load data from the second client device 406, or to upload data onto the second client device 406.

A computer program product is tangibly embodied in storage medium 512, a machine-readable storage medium. The computer program product includes instructions that, when read by a machine, operate to cause a data processing apparatus to store image data in the mobile device. In some embodiments, the computer program product includes instructions that generate a visual programming environment for developing applications for mobile devices.

The operating system 514 may be a LINUX-based operating system such as a mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 514 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 514, and the application programs 515 such as an email, instant messaging, a video service application, a mapping application, word processing, spreadsheet, presentation, gaming, mapping, web browsing, JAVASCRIPT engine, or other applications. For example, one implementation may allow a user to access the GMAIL email application, an instant messaging application, a social networking application, a video service application, a mapping application, or an imaging editing and presentation application. The application programs 515 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for a web-based visual programming environment for developing mobile device applications using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 517 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 517 may also be used to measure angular displacement, orientation, or velocity of the second client device 406, such as by using one or more accelerometers.

Figure 6A:
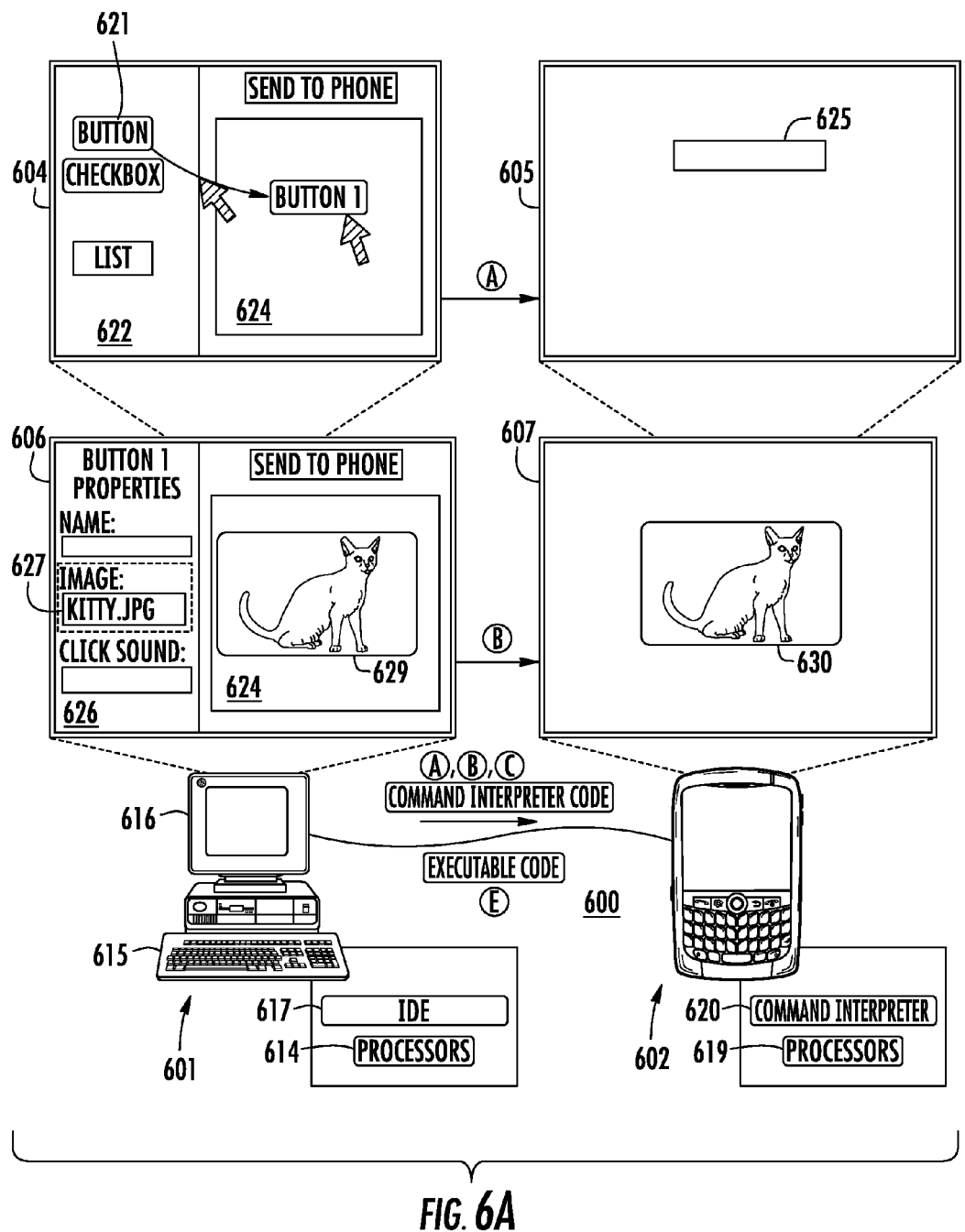
Figure 6B:
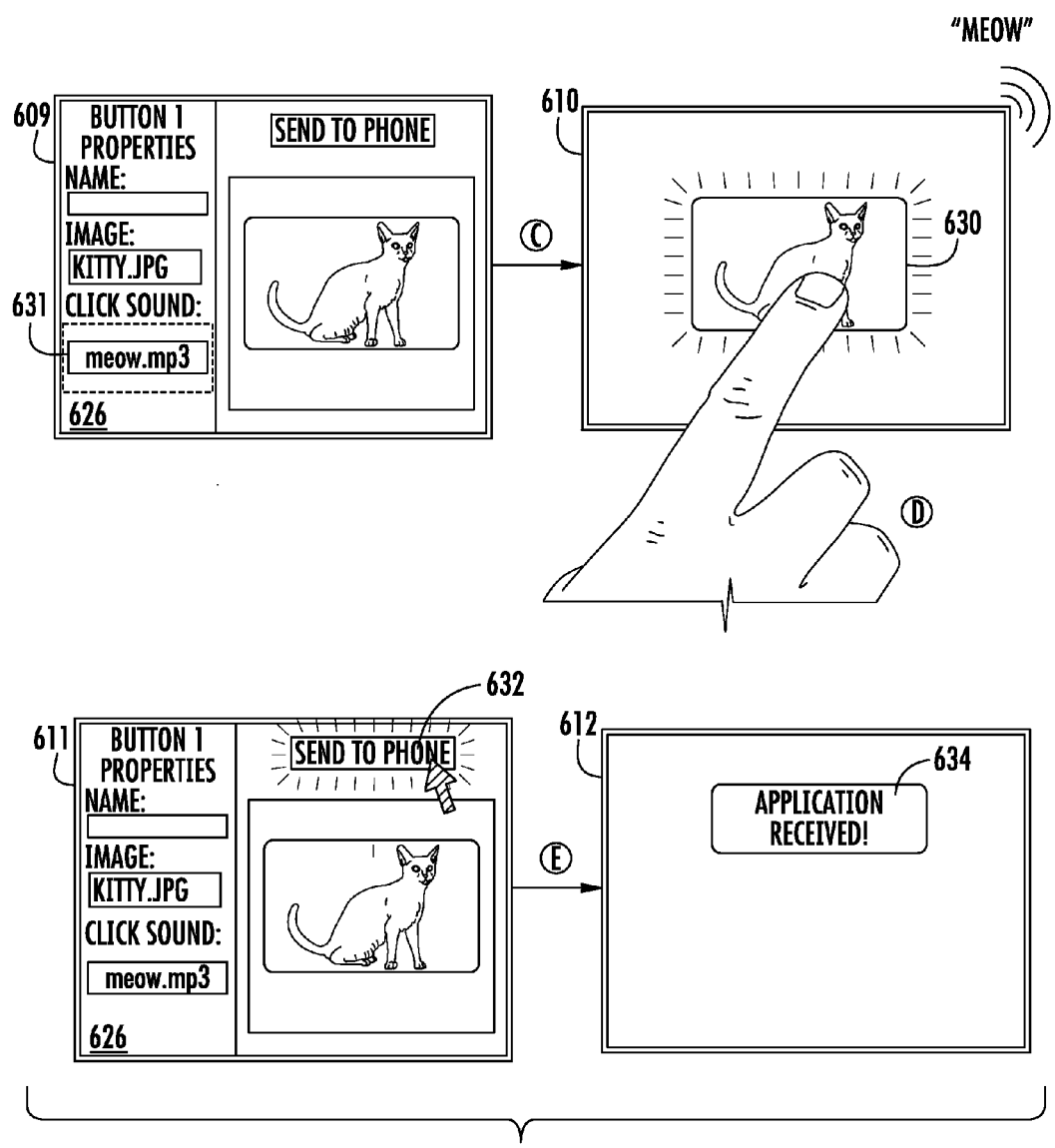

FIGS. 6A and 6B are diagrams of an example system 600 for developing mobile device applications. FIGS. 6A and 6B also illustrate a flow of data between a client device 601 and a mobile device 602 that occurs during states (a) to (e), as well as user interfaces 604 to 612 that are displayed on the client device 601 and the mobile device 602 during various states. The states (a) to (e) may occur in the illustrated sequence, or they may occur in a sequence that is different than the illustrated sequence.

The client device 601 may be any type of computing device that includes, among other things, one or more processors 614, an input device 615, a display 616, and an IDE 617 for developing mobile device applications. The IDE 617 may be a visual programming IDE, such as the visual programming IDE described with reference to FIG. 2, or the IDE 617 may not be a visual programming IDE.

The mobile device 602 is any type of portable computing device, such as a cellular phone, e-book reader, tablet computer, music player, smart phone, PDA, notebook computer, or other mobile device. Among other things, the mobile device 602 includes one or more processors 619 and a command interpreter 620 which, as the term is referred to by this specification, is an application that receives interpreter code, and interprets the interpreter code in the context of a given operating system. Interpreter code, which is 'indirectly' executed (or "interpreted") by the command interpreter 620, is different from compiler code, which is converted into machine code and then 'directly' executed by the a processor. The command interpreter 620 may be, for example, a Perl, Python, MATLAB, Ruby, Lisp, Scheme, or Java interpreter.

The mobile device 602 is directly connected to the client device 601 over a wireless or wireline connection. In an alternate implementation, the mobile device 602 is connected to the client device 601 some other way, such as over a network connection.

The user of the client device 601 intends to develop an application that displays an image of a cat and that, when detecting that the image has been touched or selected, plays a "meow" sound. During state (a), the user invokes the IDE 617, which displays the user interface 604 on the client device 601.

Because (in this example) the IDE 617 is a visual programming IDE, the user begins developing this application by selecting an interactive user interface element, i.e., a button component 621, on the user interface 604, and dragging the user interface element from a components palette 622 of the user interface into a desired position or arrangement within the components pane 624. The selection and arrangement of the button component 621 within the components pane 624 defines an initial portion or aspect of the application under development, specifically a portion of the application where a user interface element is initially displayed or presented on a user interface.

The client device 601 generates interpreter code that corresponds to the action of displaying a button on a user interface, and transmits this interpreter code to the mobile device 602. The command interpreter 620 on the mobile device 602 interprets this interpreter code and, as shown in user interface 605, displays a button 625 on a mock-up version of the application (or, more specifically, on a mock-up of the user interface that would be generated by the application). Because the user has not yet defined any properties of the button 621 through the IDE 617 or, alternatively, because the button does not have any default properties other than a default type, shape or size, the button 625 displayed on the user interface 605 appears relatively generic.

During state (b), to display the image of the cat, the user accesses a properties pane 626 for the button 621, and enters a file name associated with an image of a cat (in the drawing, "kitty.jpg") in the "image" property text entry field 627. The image 629 of the cat is displayed or overlaid on the button 621 in the component pane 624 on the client device 601.

Although the application is not yet completed, the client device 601 generates interpreter code that corresponds to the action of displaying the image of the cat on a button on a user interface, and transmits this interpreter code to the mobile device 602. The client device 601 may transmit other information as well, such as the file "kitty.jpg." The command interpreter 620 on the mobile device 602 interprets this interpreter code and, as shown in user interface 607, displays an image 630 of a cat on the button 625. Because the user has not yet defined any action that is to occur when the button 621 is selected, nothing would happen if the user selected the button 625 on the mobile device 602 other than, perhaps, an animation of a button depression.

Referring to FIG. 6B, during state (c), to cause a "meow" sound to be played when the cat image is touched or selected, the user accesses the properties pane 626, and enters the file name of a sound file that plays the "meow" sound (in the drawing, "meow.mp3") in the "click sound" property text entry field. If the user were to select the button 621 in the components pane 624 (or in a preview pane), the "meow" sound may be played through a speaker of the client device 601.

The client device 601 generates interpreter code that corresponds to the action of playing the "meow" sound when the button 625 is selected, and transmits this interpreter code to the mobile device 602. The client device 601 may transmit other information as well, such as the file "meow.mp3." The command interpreter 620 on the mobile device 602 interprets this interpreter code and, as shown in the user interface 610, plays, during state (d), the "meow" sound when the user selects the button 625 on the mock-up version of the application.

During state (e), once the user is satisfied that the application is complete, the user may select a control 632 to instruct the visual programming IDE to generate executable code that may be executed on the mobile device 602, and provides this executable code to the mobile device 602. The mobile device 602 may acknowledge receipt of this executable code, for example by displaying an acknowledgement message 634 in the user interface 612. The mobile device 602 may delete or retain the interpreter code after a more recent version of the interpreter code is received, or after receiving the executable code that corresponds to the application.

Figure 7:
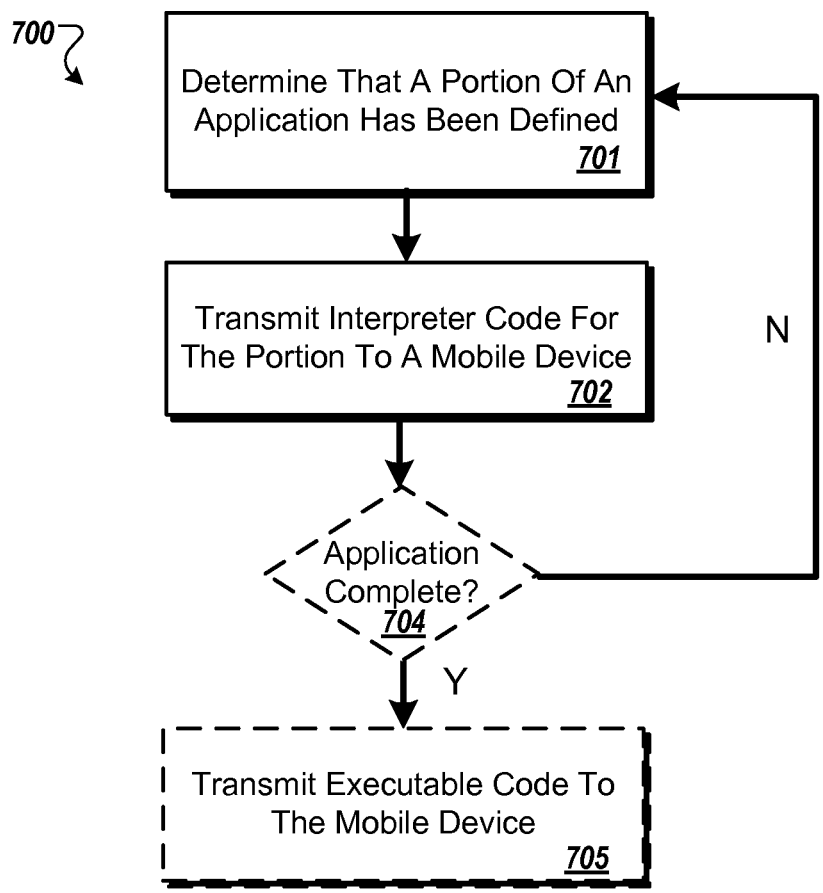

FIG. 7 is a flowchart of an exemplary process 700. Briefly, the process 700 includes determining that a user has entered one or more user inputs into an integrated development environment, to select or arrange a component that defines a portion of an application, and transmitting interpreter code that corresponds to the component to a mobile device, where the interpreter code, when interpreted by a command interpreter on the mobile device, causes the mobile device to generate a mock-up of the portion of the application defined by the component.

When the process 700 begins, a user enters one or more user inputs into an integrated development environment (701). The user inputs may, for example, select or arrange one or more components that define a portion of an application. The user inputs may be entered through an integrated development environment running on a client device.

As the user programs the application, i.e., before the application is complete, interpreter code that corresponds to the components that the user has defined is communicated to a mobile device (702). When interpreted by a command interpreter on the mobile device, the interpreter code causes the mobile device to generate a mock-up of the portion of the application defined by the component. The IDE may communicate interpreter code to implement the mock-up of the application instead of executable code because, among other reasons, it may be difficult or impossible for the IDE to generate executable code for the application while it the application is incomplete, unfinished, or otherwise still under development.

The interpreter code may be communicated to the mobile device when, for example, the user selects a component from a component palette and drags the component to a preview pane or components pane. Additionally or alternatively, the interpreter code may be communicated to the mobile device when the component is selected, i.e., in the component palette or blocks editor, and, through a context menu item, the user selects a "Do It" control. The context menu may be shown, for example, when the user 'right clicks' on a component.

When the "Do It" control is selected, interpreter code corresponding to that component is communicated the mobile device for interpretation by the command interpreter. So, for example, if a sound component is included as part of the mobile device application, the user may drag a SOUND.PLAY block onto the blocks editor and then select the "Do It" control to hear the sound component play on the mobile device or the client device, even before the user has created any buttons and added the sound component to a BUTTON-.WHENCLICKED block, or to other mechanism that would allow a user to trigger the playing of the sound on the mobile device.

Moreover, the "Do It" control allows the user to view the result of a calculation performed by any component (or set of connected components) by sending the code that corresponds to the component to a command interpreter on the mobile device or the client device, causing the result of the calculation to be displayed near the appropriate block in the blocks editor. Finally, in addition to or instead of the "Do It" control, the context menu (or a different context menu) may include a "Watch" control that allows the user to monitor a variable, property or block calculation, and to continuously update and display the value of that variable, property or calculation as the application runs and is interacted with by the user on the client device or the mobile device.

The interpreter code may be iteratively transmitted as the user enters the one or more inputs that select or arrange different components. For instance, if the application is not complete (704, "N"), the user may select or arrange another component that defines a different portion of the application (701). If the application is complete (704, "Y"), executable code for the application may be generated, and may be transmitted to the mobile device.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method for creating a mobile device application comprising:
    generating, by a server device, a visual programming interface for display on a client device, wherein the visual programming interface includes interface elements that permit a user of the client device to graphically select and arrange components to define the mobile device application, wherein at least some of the components define functional elements of the mobile device application;
    generating, by the server device, a binary executable of the mobile device application based on a signal received from the client device, such that when executed by the client device, a mock-up of the mobile device application is generated;
    transmitting the binary executable to the client device for execution;
    determining that the mobile device application is incomplete;
    generating, by the server device, interpreter code based on the incomplete mobile device application that is capable of generating a mock-up of completed portions of the mobile device application when executed by a command interpreter;
    transmitting the interpreter code to the mobile device for execution by a command interpreter of the client device;
    wherein the binary executable is a first binary executable, generating the visual programming interface includes generating a barcode for display on the client device and the method further comprises:
    receiving a signal from the mobile device based at least in part on barcode data received by the mobile device by scanning the barcode;
    generating, by the server device, a second binary executable of the mobile device application based at least in part on the data; and
    transmitting the second binary executable directly to the mobile device.

2. The method of claim 1, wherein the binary executable includes executable code in addition to the mobile device application to enable emulation of at least one functional aspect of a mobile device that is not present in the client device.

3. The method of claim 2, wherein at least one functional aspect includes at least one of output from an accelerometer device, output from a global positioning satellite device, or output from a camera device.

4. The method of claim 3, wherein the binary executable includes a GPS emulator capable of receiving input to emulate GPS output corresponding to at least one of a static geographical location or a route between two or more locations.

5. The method of claim 1, wherein the
    second binary executable of the mobile device application is based on a configuration of the mobile device.

6. The method of claim 5, wherein the configuration of the mobile device is associated with one or more device profiles of mobile devices accessible by the server device, and wherein the generation of the second binary executable is further based on the one or more device profiles.

7. A method for creating a mobile device application comprising:
    generating, by a server device, a visual programming interface for display on a client device, wherein the visual programming interface includes interface elements that permit a user of the client device to graphically select and arrange components to define the mobile device application, wherein at least some of the components define functional elements of the mobile device application;
    generating, by the server device, a binary executable of the mobile device application based on a received signal and a configuration of a mobile device;
    transmitting the binary executable directly to the mobile device for execution;
    determining that the mobile device application is incomplete;
    generating, by the server device, interpreter code based on the incomplete mobile device application that is capable of generating a mock-up of completed portions of the mobile device application when executed by a command interpreter; and
    transmitting the interpreter code to the mobile device for execution by a command interpreter of the mobile device;
    wherein generating the visual programming interface includes generating a barcode for display on the client device and the method further comprises:
    receiving a signal from the mobile device based at least in part on barcode data received by the mobile device by scanning the barcode.

8. The method of claim 7, wherein the signal is received from the client device and is generated based on user input to the visual graphical user interface to deploy the mobile device application to the mobile device, and the method further comprises identifying that the mobile device is associated with the user.

9. The method of claim 7, wherein the configuration of the mobile device is associated with one or more device profiles of mobile devices accessible by the server device, and wherein the generation of the binary executable is further based on the one or more device profiles.

10. The method of claim 7, wherein the incomplete mobile device application does not include at least one component required to generate the binary executable of the mobile device application.

11. An apparatus for creating a mobile device application, the apparatus comprising:
a memory; and
a processor configured to execute instructions stored in the memory to:
generate a visual programming interface for display on a client device, wherein the visual programming interface includes interface elements that permit a user of the client device to graphically select and arrange components to define the mobile device application, wherein at least some of the components define functional elements of the mobile device application;
generate a binary executable of the mobile device application based on a signal received from the client device, such that when executed by a client device, a mock-up of the mobile device application is generated;
transmit the binary executable to the client device for execution;
determine that the mobile device application is incomplete;
generate interpreter code based on the incomplete mobile device application that is capable of generating a mock-up of completed portions of the mobile device application when executed by a command interpreter; and
transmit the interpreter code to the mobile device for execution by a command interpreter of the mobile device;
wherein the binary executable is a first binary executable, the instructions to generate the visual programming interface includes generating a barcode for display on the client device, and the memory further includes instructions to:
receive a signal from the mobile device based at least in part on barcode data received by the mobile device by scanning the barcode;
generate a second binary executable of the mobile device application based at least in part on the barcode data; and
transmit the second binary executable directly to the mobile device.

12. The apparatus of claim 11, wherein the binary executable includes executable code in addition to the mobile device application to enable emulation of at least one functional aspect of a mobile device not present in the client device.

13. The apparatus of claim 12, wherein the functional aspect includes at least one of output from an accelerometer device, output from a global positioning satellite device, or output from a camera device.

14. The apparatus of claim 13, wherein the binary executable includes a GPS emulator capable of receiving input to emulate GPS output corresponding to at least one a static geographical location or a route between two or more locations.

15. The apparatus of claim 11, wherein the memory further includes instructions to:
generate the second binary executable of the mobile device application based on a configuration of the mobile device.

16. The apparatus of claim 15, wherein the configuration of the mobile device is associated with one or more device profiles of mobile devices stored in the memory, and wherein the instructions to generate the second binary executable include using the one or more device profiles.

* * * * *